United States Patent

[11] 3,580,225

[72] Inventor John W. Coy
 Exton, Pa.
[21] Appl. No. 879,355
[22] Filed Nov. 24, 1969
[45] Patented May 25, 1971
[73] Assignee Coy Oil Co., Inc.
 Exton, Pa.
 Continuation-in-part of application Ser. No. 798,406, Feb. 11, 1969, now abandoned.

[54] ECONOMIZER
 13 Claims, 8 Drawing Figs.
[52] U.S. Cl. .................................................. 122/20, 165/158
[51] Int. Cl. .................................................. F22b 33/00, F28f 9/02
[50] Field of Search ....................................... 126/110, 307; 165/122, 158; 122/20 (B); 237/55

[56] References Cited
 UNITED STATES PATENTS
| | | | |
|---|---|---|---|
| 1,807,481 | 5/1931 | Klein | 122/20B |
| 1,892,188 | 12/1932 | Goodridge | 122/20BX |
| 2,026,399 | 12/1935 | Pierce | 122/20BX |
| 2,189,749 | 2/1940 | Windheim et al. | 122/20B |
| 2,362,940 | 11/1944 | Skerritt | 126/110UXV |

Primary Examiner—Charles J. Myhre
Attorney—Howson and Howson

ABSTRACT: A heating system having a furnace with a flue and a chimney in communication with the flue for venting combustion gases to the atmosphere is provided with an economizer heat exchanger intermediate the flue and the chimney for extracting an additional quantity of heat from the combustion gases to improve the efficiency of the heating system. The economizer comprises a horizontally disposed cylindrical shell mounting a bank of tubes adjacent its bottom and having an inlet chamber at one end connected to the flue and an outlet chamber at its other end connected to the chimney, the chambers being in communication with one another through the tubes. The tubes are supported at their ends and they are spaced apart by means of walls extending across the shell, the walls forming therebetween a cavity through which fluid is flowed upwardly across the tubes for extracting heat therefrom as the combustion gases flow through the tubes. A fan is mounted in the outlet chamber for inducing the gases to flow through the tubes and out the chimney, the fan having a greater capacity for removing the gases than the furnace has for producing them. In addition, means is provided to regulate the pressure in the combustion chamber of the furnace, the pressure being reduced below atmospheric due to the operation of the fan.

Patented May 25, 1971
3,580,225
2 Sheets-Sheet 1
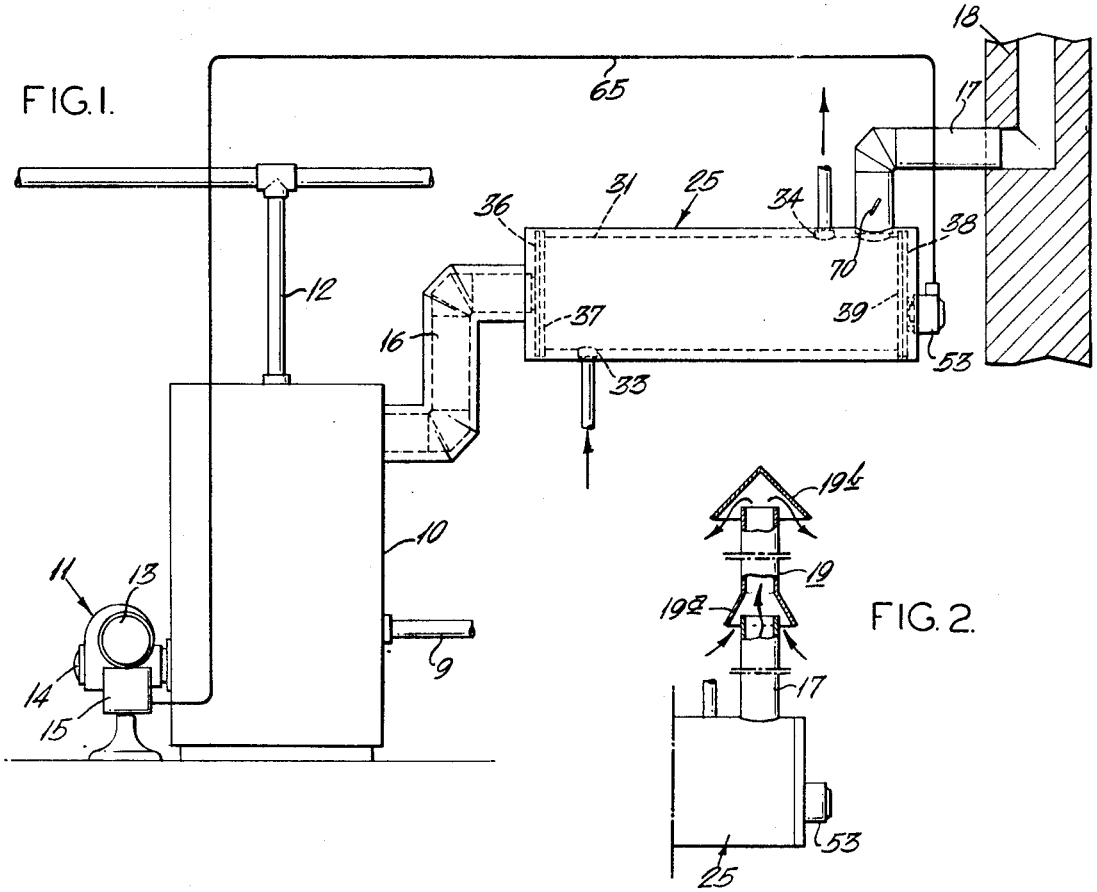
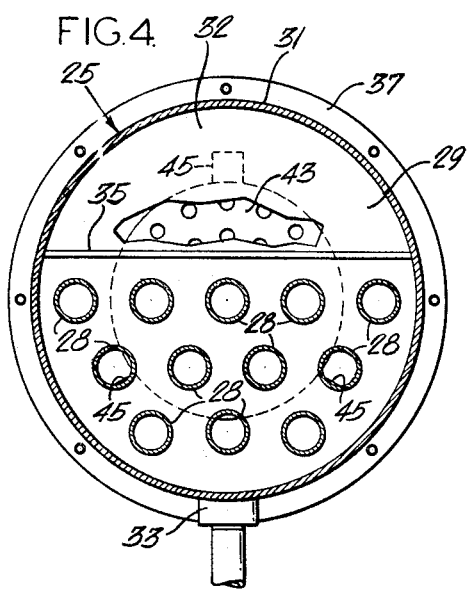
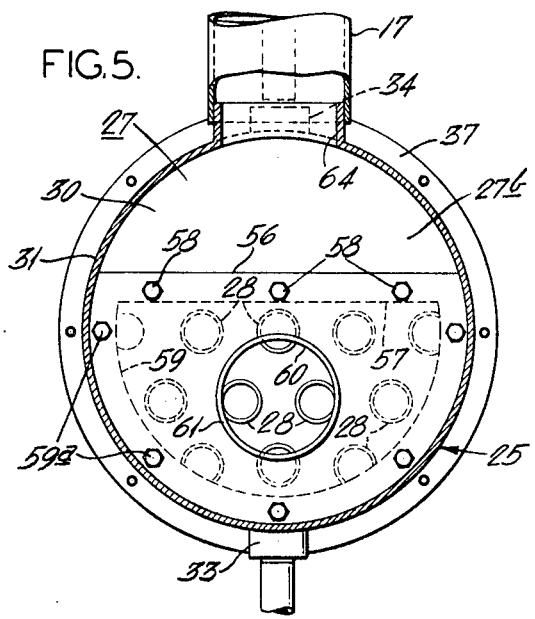
INVENTOR:
JOHN WILLIAM COY
BY
Howson & Howson
ATTYS.

Patented May 25, 1971
3,580,225
2 Sheets-Sheet 2
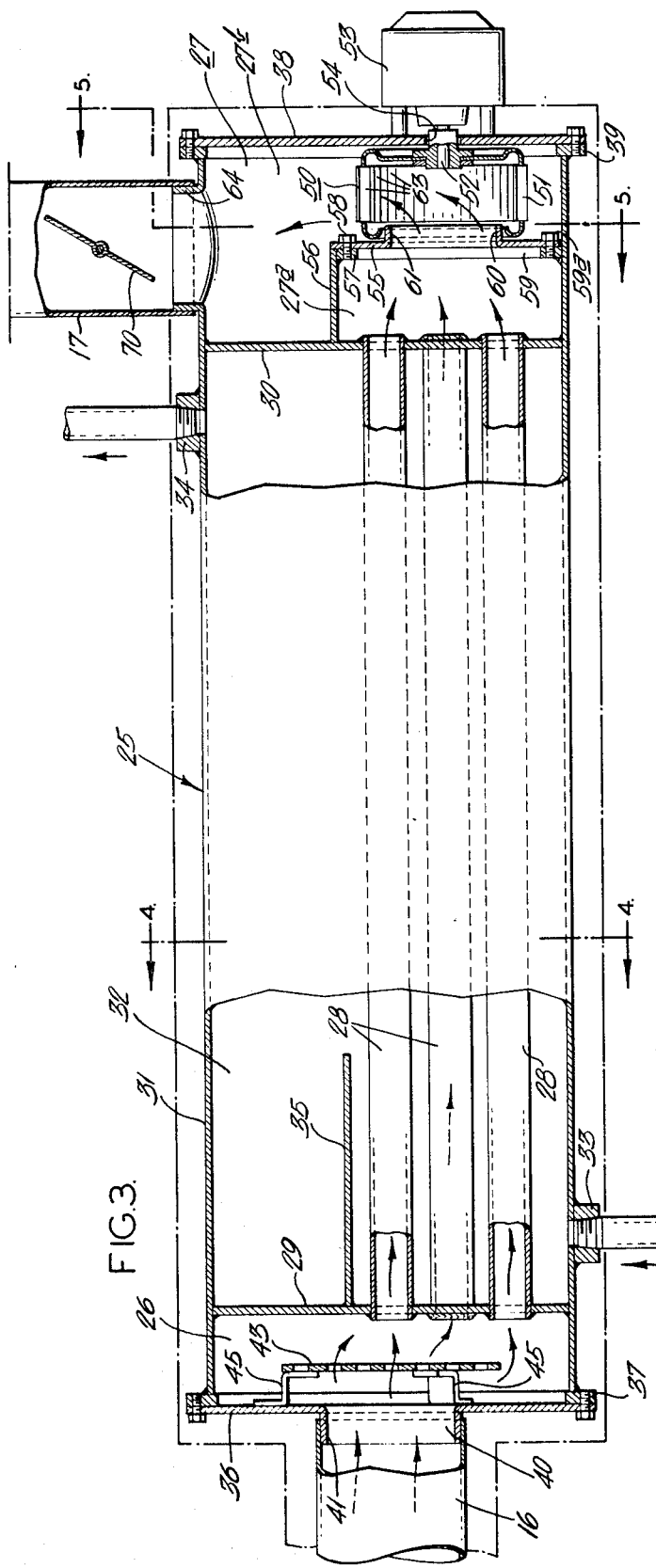
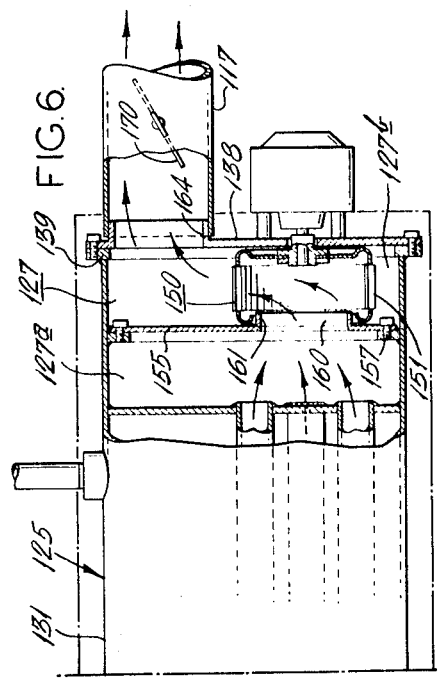
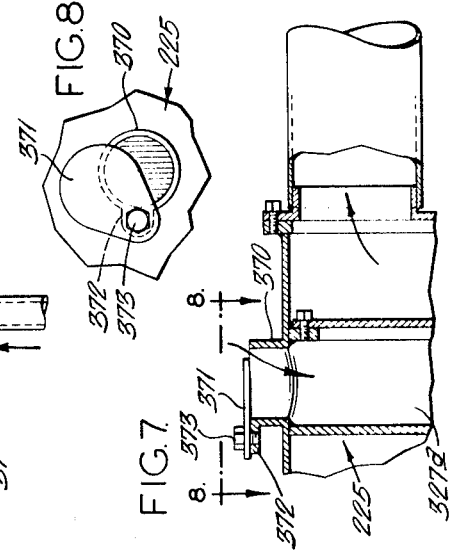
INVENTOR:
JOHN WILLIAM COY
BY
Howson & Howson
ATTYS.

ECONOMIZER

The present application is a continuation-in-part of my copending application Ser. No. 798,406, filed Feb. 11, 1969, and entitled Flue Gas Heat Recovery System, now abandoned.

The present invention relates to heat exchange systems, and more particularly, the present invention relates to a heat exchange unit adapted to be installed in a domestic or light industrial heating system for improving the thermal efficiency of the system.

At present, domestic and relatively low capacity industrial heating systems have furnaces with combustion chambers venting hot gases to the atmosphere after they pass over a heat exchanger in the furnace. Although existing furnace heat exchangers are efficient, nevertheless, they are not capable of extracting substantially all of the heat from the gases, resulting in an overall efficiency of 70—75 percent. It is well known that the efficiency of a furnace is related to the temperature of the combustion gases entering the flue after passing through the heat exchanger. High combustion gas temperatures (600°-—800° F.) generally indicate low heat transfer efficiency in the heat exchanger, which may be caused by soot on the exchanger, an improper air-fuel mixture, inadequate draft or the like. Conversely, low combustion gas temperatures (200°-—300° F.) generally indicate high heat transfer efficiency, which may be attributed to lack of soot on the exchanger, proper air-fuel mixture and proper draft. In any case, exhaust gas temperatures as low as 300° F., are uncommon with existing furnaces.

Heat exchanger structures are known for extracting additional heat from combustion gases at a location downstream of a primary heat exchanger. Heretofore, however, such exchanger structures have not been used in conjunction with domestic or light industrial heating systems. One reason is because they have tended to be bulky, thereby requiring valuable space for effecting proper installation. In addition to being bulky, existing heat exchangers have been heavy, requiring costly mounting structures. Moreover, prior heat exchangers have been complex and costly to manufacture, thereby pricing them out of the domestic and light industrial market. The availability of compact, relatively low cost heat exchangers, or economizers as they are sometimes called, would enable home owners to increase the capacity of their existing heating systems or would enable builders to provide adequate heating capacity using smaller furnaces than would otherwise be required.

With the foregoing in mind, it is a primary object of the present invention to provide a novel economizer for use in increasing the efficiency of domestic and light industrial heating systems.

It is another object of the present invention to provide an improved economizer which is simple in construction and which is economical to manufacture.

As a further object, the present invention provides a compact economizes which is adapted to be installed in relatively confined locations.

It is a still further object of the present invention to provide an economizer for lowering the temperature of exhausted combustion gases. More specifically, the present invention provides a novel economizer for use in extracting a quantity of heat from hot combustion gases in addition to the heat normally extracted therefrom by a heat exchanger located upstream thereof in a furnace. The economizer comprises an inlet chamber for receiving the combustion gases from the furnace and an outlet chamber spaced from the inlet chamber and in communication therewith through a bank of tubes extending horizontally therebetween. A shell surrounds the bank of tubes and mounts a wall at each end of the bank to space and support the tubes, the walls defining a fluidtight cavity around the tubes. Means is provided to flow a fluid in a generally upward direction in the cavity and across the tubes for extracting heat therefrom as combustion gases flow through the bank of tubes. Means is provided to close the ends of the shell and thereby form the inlet and outlet chambers at its opposite ends. The outlet chamber has a suction and an exhaust section with means including a fan connected across the sections to induce a flow of the combustion gases through the bank of tubes, the fan having sufficient capacity to remove from the furnace a greater volume of gases than the furnace is capable of producing. Means is also provided to regulate the flow of combustion gases from the outlet chamber to affect the pressure in the combustion chamber of the furnace.

These and other objects, features and advantages of the present invention should become apparent from the following description when taken in conjunction with the accompanying drawings in which:

FIG. 1 is a side elevational view of a heating system having an economizer embodying the present invention;

FIG. 2 is a foreshortened fragmentary view of a modified stack adapted for use in the present invention;

FIG. 3 is a side elevational view of the economizer of FIG. 1 having portions broken away and sectioned to illustrate construction details including a bank of tubes and a fan for inducing a draft in the tubes;

FIGS. 4 and 5 are cross-sectional views taken along lines 4—4 and 5—5 respectively of FIG. 3 to illustrate the manner in which the tubes are mounted in the economizer;

FIG. 6 is a reduced side elevational view of a modified embodiment of the economizer of the present invention;

FIG. 7 is an enlarged fragmentary and partially sectional view of the upper right-hand end of the modified economizer of FIG. 6 and including means for regulating the gas flow in the economizer and the pressure in the combustion chamber of a furnace employed in conjunction with the economizer; and FIG. 8 is a plan view taken along line 8—8 of FIG. 7.

Referring now to the drawings, there is illustrated in FIG. 1 a heating system embodying the present invention. As may be seen therein, the heating system comprises a furnace 10 having a combustion chamber and a heat exchanger overlying the combustion chamber for extracting heat from gases produced in the combustion chamber. Relatively cold return water is admitted into the bottom of the heat exchanger through an inlet pipe 9 and is removed therefrom by an outlet pipe 12. The gases are produced by the combustion of fuel in air both of which are supplied to the combustion chamber by means of a conventional burner 11. The burner 11 has a blower 13 for supplying the air and a fuel pump 14 for supplying the fuel. Ignition is provided by electrical energy from a transformer and control box 15 mounted on the side of the burner. The combustion gases produced by the furnace 10 are vented to the atmosphere through an insulated flue pipe 16 connected to the furnace 10 and through a stack 17 projecting upwardly through a wall or chimney 18. As may be seen in FIG. 2, the top of the stack 17 mounts a venturi-type cap 19 which prevents rainwater from entering the stack 17 and which, for reasons to be more fully described hereinafter, operates to mix atmospheric air with the combustion gases before they are discharged into the atmosphere. In addition, the cap 19 also tends to prevent downdrafts from adversely affecting the operation of the furnace.

As noted heretofore, the temperature of the gases entering the flue pipe 16 is normally in a range of 600°—800° F., for the conventional domestic or light industrial furnace, representing a thermal efficiency of about 70—75 percent. Thus, it should be apparent that a considerable amount of sensible heat is normally transferred to the atmosphere and is thereby lost. The present invention provides novel apparatus for use in the aforementioned heating systems to recover a substantial portion of the heat which would otherwise be lost to the atmosphere to thereby increase the efficiency of the heating system.

To this end, an economizer 25 is connected intermediate the flue pipe 16 and the stack 17. As may be seen in FIG. 3, the economizer 25 has an inlet chamber 26 and an outlet chamber 27 spaced from the inlet chamber. The inlet chamber 26 is in gas communication with the flue pipe 16 for receiving the hot combustion gases, the outlet chamber 27 is in gas communication with the stack 17. Interconnecting the inlet and outlet chambers is a bank of horizontally disposed, elongated tubes 28, 28 which provide a gas flow path in a rightward direction from the inlet chamber 26 to the outlet chamber 27.

As may be seen in FIGS. 3 and 4, the tubes 28, 28 are mounted at their ends in walls 29 and 30, in the present instance by welding. The wall 29 is located adjacent the inlet chamber 26 and the wall 30 is located adjacent the outlet chamber 27, both walls extending completely across the diameter of an externally insulated cylindrical shell 31 surrounding the bank of tubes 28, 28 and extending beyond their ends. The walls 29 and 30 and the shell 31 cooperate to form a fluidtight cavity 32 through which a fluid, in the present instance water, is flowed in a generally upward direction across the exterior of the tubes 28, 28 by means of an internally threaded fitting 33 in the bottom of the shell 31 adjacent the inlet chamber wall 29 and an internally threaded fitting 34 in the top of the shell 31 adjacent the outlet chamber wall 30. A baffle 35 overlies the bank of tubes 28, 28 and is mounted on the inlet chamber wall 29, extending outwardly therefrom for approximately one-fourth of the length of the tubes. The baffle 35 operates to deflect upwardly flowing fluid rightward along the exterior of the tubes 28, 28 to thereby increase its period of contact with the tubes and thus improve the efficiency of the economizer. In the present instance, the baffle 35 is welded to the inlet chamber wall 29; however, it should be apparent that other mounting arrangements may be employed satisfactorily.

For the purpose of defining the inlet and outlet chambers, means is provided to close the ends of the shell 31. As may be seen in FIG. 3, the closure means comprises a circular plate 36 bolted to a peripheral flange 37 on the shell 31 at the inlet chamber 26 and a circular plate 38 bolted to a like peripheral flange 39 on the shell 31 at the outlet chamber 27. In the present instance, the shell 31 is offset upwardly with respect to the bank of tubes 28, 28 and the plate 36 has a central aperture 40 therein surrounded by a protruding neck 41 onto which the flue pipe 16 is telescopically mounted. In order to prevent the combustion gases from passing through only the uppermost tubes 28, 28 in the bank, a perforated baffle plate 43 is spaced from the aperture 40 and is mounted onto the inside of the plate 36 by means of circumferentially spaced bracket elements 45, 45 welded or otherwise fastened between the baffle plate 43 and the wall 36. With this structure, the flow of combustion gases into the inlet chamber 26 is redistributed to insure a substantially uniform flow through each tube 28 in the bank, and the closure plates may be readily removed for cleaning the tubes 28, 28.

Advantages in addition to that of heat recovery are realized from the economizer 25 of the present invention. For example, the economizer provides thermal inertia to the heating system in which it is connected by storing a quantity of heat in the water surrounding the tubes 28, 28 in the fluid cavity 32. In order to prevent the water in the cavity 32 from cooling rapidly when the furnace is not running, means is provided to cause a pressure drop to occur in the economizer so that the natural draft of the stack 17 does not effect a cooling of the water in the cavity 32 by drawing room temperature air through the furnace 10, the flue pipe 16, and the economizer 25. In the present instance, a pressure drop is caused by the flow of gas through the baffle plate 43 and the tubes 28, 28 as well as through the outlet chamber 27. In order to overcome the aforementioned pressure drop and to maintain the velocity of gas flow through the tubes 28, 28, means is provided in the outlet chamber 27 to induce a draft in the tubes 28, 28. In the illustrated embodiment, the draft-inducing means comprises a fan 50 having a rotor 51 mounted on a shaft 52 of an electric motor 53. As may be seen in FIG. 3, the motor 53 is mounted on the outside wall 38 of the outlet chamber 27 to cause its shaft 52 to extend inwardly through a bore 54 in the wall 38. The fan rotor 51 is disposed in close proximity to the outside wall 38 and a slight clearance exists around the periphery of the shaft 52. With this structure, air may be flowed inwardly along the shaft 52 when the rotor rotates to cool the shaft and prevent the bearings of the motor 53 from becoming overheated by the conduction of heat along the shaft 52.

In accordance with the present invention, the outlet chamber 27 is divided into a suction section 27a and an exhaust section 27b and the fan rotor 51 is disposed in the outlet chamber 27 to cause gas to flow from the suction section 27a to the exhaust section 27b when the rotor 51 is rotated. In the embodiment illustrated in FIG. 3, the outlet chamber 27 is partitioned by means of a wall member 55 extending partially across the shell and upwardly from the bottom thereof. The wall member 55 is connected at its upper end to a horizontally disposed member 56 (FIGS. 3 and 5) having a downturned tab 57 threadedly receiving bolts 58, 58 passing through the wall member 55. An arcuate-shaped tab 59 projects upwardly from the bottom of the shell 31 and, like the tab 57, threadedly receives bolts 59a, 59a. If desired, a gasket material may be provided between the tabs 57 and 59 and the plate 55 to provide a tight seal.

Communication between the suction section 27a and the exhaust section 27b is provided by means which forms an aperture 60 centrally in the wall member 55. A neck or flange 61 surrounds the aperture 60 and projects rightward into the exhaust section 27b and in the direction of gas flow. As may be seen in FIG. 3, the fan rotor 51 has a series of circumferentially spaced blades 63, 63 surrounding the neck 61 so that when the rotor 51 is rotated, the gases flow axially into the rotor 51 from the suction section 27a and radially outward thereof into the exhaust section 27b. The gases are flowed outwardly of the exhaust section 27b through a neck 64 located on the top of the shell 31 and telescopically mounting the stack pipe 17. It is to be noted that the location of the rotor 51 adjacent the bottom of the shell 31 obviates the need for a scroll around the rotor and thereby conserves weight and cost as well as space.

In accordance with the present invention, it has been found that a novel relation exists between the capacities of the blower 13 and the fan 50 if satisfactory economizer operation is to be maintained. In the present instance, the blower and fan are both centrifugal-type units with the fan 50 having twice the volumetric capacity of the blower 13 so that a negative pressure of about 20—25 inches of water is produced in the combustion chamber of the furnace 10. The negative pressure causes an inward flow of air through any openings in the furnace to thereby prevent the discharge of noxious odors from the furnace. More importantly, however, the fan 50 increases the velocity of the combustion gases across the furnace heat exchanger and through the tubes 28 in the economizer 25 to thereby improve the heat transfer coefficients therein and effect an increase in the overall heat transfer efficiency of the combined units. In addition, the combination of lower gas temperatures (200°—300° F.) exiting from the economizer 25 and a positive pressure in exhaust section 27b of the outlet chamber in the economizer combine to enable stack piping to be sized smaller, thereby effecting installation economies.

The fan 50 operates in response to the operation of the blower 13. To this end, the motor 53 is powered by current supplied by means of a wire 65 connected to a receptacle on the burner 11. The motor 53 is wired into the burner circuit to cause it to be energized when the burner starts and to be deenergized when the burner stops. If the burner possesses a purge cycle control which operates to supply air to the combustion chamber before the fuel is supplied thereto and ignited, the motor 53 may be wired to be energized when the purge cycle is initiated. Also, suitable controls may be provided to cause the fan 50 to run for a short period after the burner 11 stops running to ensure that noxious combustion gases are not inadvertently discharged from the furnace.

In some installations where space is a premium, it may be desirable to mount the economizer close to floor joists. Under such circumstances, an economizer 125 having modified structure may be provided. As may be seen in FIG. 6, the modified economizer 125 has an outlet chamber 127 with a suction section 127a and an exhaust section 127b. The economizer has a cylindrical shell 131 having a peripheral flange 139 to which is bolted a closure member 138 mounting a fan 150. In this embodiment of the present invention, the wall member 155 extends completely across the shell 131 and is bolted onto an inwardly protruding flange or tab 157. Formed in the lower portion of the wall member 155 is an aperture 160 having a neck 161 therearound with a fan rotor 151 mounted in registry with the neck as in the embodiment of FIG. 3. Unlike the FIG. 3 embodiment, however, the exhaust section 127b is telescopically connected to a stack 117 through an aperture surrounded by a neck 164 in the closure plate 138. With this structure, the economizer may be mounted in close proximity to floor joists or the like.

As noted heretofore, the fan 50 has about twice the capacity of the blower 13 and operates to produce a negative pressure in the furnace combustion chamber. In some installations, however, it may be desirable to regulate the combustion chamber pressure and the gas flow rate through the economizer. To this end, adjustable means is provided which in the embodiments of FIGS. 3 and 6 includes dampers 70 and 170 mounted in the stack pipes 17 and 117 respectively. The dampers are operable upon limited rotation in either the clockwise or counterclockwise directions to increase or decrease the flow of gas and thereby adjust the pressure in the combustion chamber.

In another embodiment of the present invention, modified means may be provided to regulate the combustion chamber pressure and the economizer gas flow rate. As may be seen in FIGS. 7 and 8, an economizer 225 having a modified structure like the economizer 125 is provided with a vent 370 in communication with the suction section 327a of the outlet chamber. A cover 371 is pivotally mounted on an ear 372 on the vent 370 by means of a bolt 373 threaded into the ear 372. With this structure, the cover 371 may be pivoted in the clockwise or counterclockwise directions (FIG. 8) to increase or decrease the amount of atmospheric air entering the suction section of the economizer outlet chamber. As a result, a mixing action action of the atmospheric air with the combustion gases is effected as they pass through the fan rotor en route to the atmosphere.

As noted heretofore, the temperature of the gases leaving the economizer may be in a range of about 200°—300° F. At these relatively low temperatures, the gases emit an unpleasant odor. It has been found, although it cannot be fully explained, that the admixture of atmospheric air with the low-temperature combustion gases reduces the unpleasant odor. For this purpose, the cap 19 has a novel structure which provides a venturi effect to mix the air and exhaust gases before the exhaust gases are discharged into the atmosphere. As may be seen in FIG. 2, the cap 19 has an outwardly flared skirt 19a at its bottom end which surrounds the top end of the stack 17. Spaced upwardly from the skirt 19a is a conically shaped cover 19b which directs the mixed gases radially outward from the cap. In operation, the flow of combustion gases upwardly through the stack 17 causes atmospheric air to be entrained therewith by virtue of the venturi effect provided by the interaction of the skirt 19a and the top of the stack 17. As a result, the gases are mixed and discharged into the atmosphere relatively odor free. A similar effect is produced by the action of the vent 370 in the embodiment of FIG. 8.

In view of the foregoing, it should be apparent that a novel economizer has now been provided for increasing the efficiency of domestic and light industrial heating systems. Although the disclosed economizer has only a single bank of tubes and inlet and outlet chambers associated therewith, it should be noted that economizers having a plurality of tube banks and chambers may be provided in installations where it may be desired to couple the economizer with a plurality of furnaces.

While preferred embodiments of the present invention have been described in detail, various modifications, alterations or changes may be made without departing from the spirit and scope of the present invention as defined in the appended claims.

I claim:

1. In a heating system comprising a combustion chamber, means to supply fuel and air to the combustion chamber to effect the combustion of fuel and the production of hot gases therein, first heat transfer means associated with the combustion chamber to extract the heat therefrom, and flue means for conveying the hot combustion gases away from the combustion chamber; the improvement comprising: an economizer having an inlet chamber interconnected with said flue means to receive the hot gases and having an outlet chamber spaced from said inlet chamber, said outlet chamber having a suction section and an exhaust section, second heat transfer means including a bank of tubes disposed between and interconnecting said inlet chamber and the suction section of said outlet chamber, means to direct flow of a heat transfer liquid across the exterior of said tube to carry heat away from said tubes, a motor-driven fan in gas communication with the exhaust section of said outlet chamber and positioned between the suction and exhaust sections of said outlet chamber for inducting a flow of said hot gases in said second heat transfer means in a direction from said inlet chamber to said outlet chamber, a shell surrounding said tubes and extending beyond said tubes and forming at least a portion of the peripheral walls of said inlet and said outlet chambers, a wall at each end of said bank of tubes supporting said tubes relative to said shell and forming a fluidtight cavity surrounding said tubes, the capacity for said flow-inducing means to remove said gases from said suction section of said outlet chamber being greater than the capacity for said fuel and air supply means to produce said hot gases.

2. Apparatus according to claim 1 wherein the volumetric capacity of said fan is approximately double the volumetric capacity of said fuel and air supply means.

3. Apparatus according to claim 1 wherein said shell surrounding said tubes is offset with respect to said bank, and said fluid flow directing means is located adjacent the walls at the ends of the bank of tubes to provide fluid flow across said tubes in said cavity.

4. Apparatus according to claim 3 including means forming a closure across the ends of said shell a spaced distance from each wall to define said inlet and outlet chambers, said bank of tubes and said shell being disposed substantially horizontally with said shell being offset upwardly with respect to said bank, said fluid flow directing means including a fitting in the bottom of said shell adjacent to the wall defining said inlet chamber and another fitting in the top of said shell adjacent to the wall defining said outlet chamber, and including a baffle mounted on said inlet chamber wall to overlie said bank of tubes and extending outwardly from its mounting wall for directing flowing fluid toward the outlet chamber and across the tubes.

5. Apparatus according to claim 4 wherein said fan includes a motor mounted on said closure means adjacent said outlet chamber, said motor having a shaft extending through said closure means and into said outlet chamber, and a rotor mounted on said shaft for rotation in said outlet chamber, said rotor being disposed in said outlet chamber to cause said hot gases to flow from said suction section to said exhaust section.

6. Apparatus according to claim 5 including means interconnecting said fan motor and said fuel and air supply means to energize and deenergize said motor in response to the operation of said fuel and air supply means.

7. Apparatus according to claim 5 including a wall member extending at least partially across said shell intermediate said outlet chamber wall and said outlet chamber closure to form said suction and exhaust sections, means forming an aperture in the lower margin of said wall member, said fan rotor being disposed in registry with said aperture means so that upon rotation of the motor the hot gases flow axially into the rotor.

8. Apparatus according to claim 7 wherein said aperture forming means includes a peripheral flange surrounding the aperture and said fan rotor has a series of circumferentially spaced vanes surrounding said peripheral flange to cause the hot gases to flow axially into the rotor and radially therefrom.

9. Apparatus according to claim 8 wherein said wall member extends completely across said shell and said outlet chamber closure means has an opening above said motor for providing gas communication with said stack.

10. Apparatus according to claim 7 including means providing an adjustable vent in the top of said suction section of said outlet chamber to enable air to flow downwardly toward the aperture for mixing with the combustion gases by the fan.

11. Apparatus according to claim 7 wherein said outlet chamber closure means has a bore surrounding said motor shaft and said fan rotor is located adjacent to said outlet chamber closure means to cause air to flow axially along said shaft into the outlet chamber when the fan is rotating for effecting a cooling action on the motor shaft.

12. An economizer comprising: a hollow elongated shell, means forming a closure across the ends of said shell, a wall extending transversely of said shell a spaced distance inwardly of each of said closure means to define therebetween at least one inlet chamber at one end and at least one outlet chamber at the other end, said walls cooperating with said shell to define a fluidtight cavity therebetween, at least one bank of hollow tubes mounted at their opposite ends in each wall for providing gas communication between said inlet and outlet chambers, means partitioning said outlet chamber into a suction section and an exhaust section, means forming an aperture in said partitioning means to provide gas communication between said suction and exhaust sections, a fan mounted on said shell closure means adjacent said outlet chamber and having a rotor in registry with said aperture means to cause gas to flow through said tubes and from said suction section to said exhaust section when the rotor is rotated, means providing a gas flow passage for said inlet chamber and said exhaust section of said outlet chamber, and means for directing a flow of fluid across said tubes in said cavity, whereby heat may be transferred to the flowing fluid from gases flowing through the tubes.

13. An economizer according to claim 12 wherein said shell is cylindrical and has a peripheral flange at each end, and said closure means includes a plate engaging said flange and threaded fasteners engaging said flange and said plate to mount said plate thereto, whereby at least one of said plates may be removed for cleaning the tubes.